April 1, 1947.   L. E. SIMMONS   2,418,320
METHOD OF FORMING CUTTER BITS
Original Filed Dec. 24, 1943
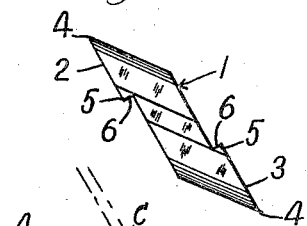
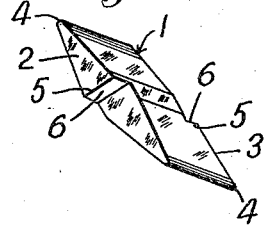
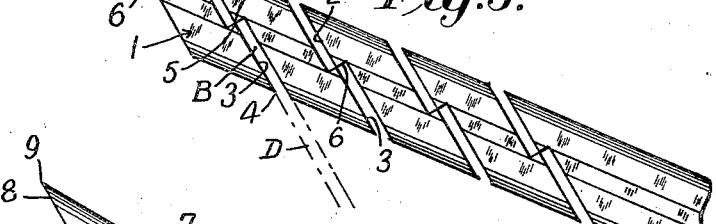
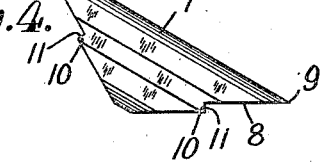
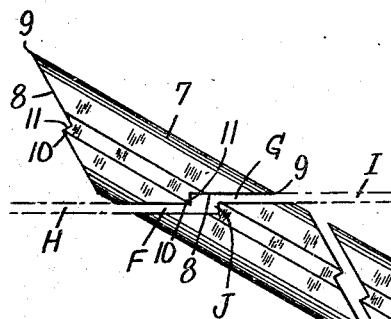
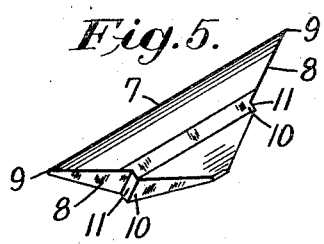
*Inventor:*
*Leon E. Simmons.*
by
*Louis A. Maxon,*
*Atty.*

Patented Apr. 1, 1947

2,418,320

UNITED STATES PATENT OFFICE 2,418,320

METHOD OF FORMING CUTTER BITS

Leon E. Simmons, Claremont, N. H., assignor to Joy Manufacturing Company, a corporation of Pennsylvania Original application December 24, 1943, Serial No. 515,493. Divided and this application September 11, 1945, Serial No. 615,592

7 Claims. (Cl. 76—101)

This invention relates to cutter bits and more particularly to improved methods of forming cutter bits.

Mining machine cutter bits of the double pointed reversible type are usually quite small, containing a minimum quantity of metal, and due to their relatively small size, considerable difficulty has been encountered in properly securing the bits in cutting position on the chain blocks of the cutter chain. In such cutter bits, it is found desirable to provide abutments or shoulders on the cutting faces inwardly of the cutting points so that in the reversed positions of the bit on the chain, a shoulder may engage supporting means on the block. In certain types of cutter bits, it is also desirable to engage one of the shoulders by an adjustable holder so that the cutter bit is not only firmly supported but also the bit is rigidly locked in position.

Double pointed reversible cutter bits of the above character are usually formed of relatively hard metal and are ofttimes cut off from a piece of flat bar stock, and in the present construction, the cutter bits are cut off from bar stock in a novel manner whereby the abutments or shoulders are formed concurrently with the cutting off operation. In one embodiment, the cutter bit is in the shape of a parallelogram preferably a rhomboid and is formed by making parallel cuts diagonally of a piece of flat bar stock from the opposite sides of the bar, with the cuts disposed in close adjacency so that their inner adjacent walls lie in a common plane, and the cuts substantially joining at least adjacent the longitudinal center of the bar stock. In another embodiment, the cutter bit is of triangular shape and is formed by making parallel cuts diagonally of the bar stock, and completing the bit by turning over the stock between the parallel cuts and the next ones. In accordance with the improved method, the supporting and locking abutments or shoulders on the cutting faces on the bit are formed concurrently with the cutting off operations.

An object of the present invention is to provide an improved cutter bit of a novel design. Another object is to provide an improved method of forming a cutter bit. Yet another object is to provide an improved method of forming reversible cutter bits of the double pointed type having shoulders or abutments formed on its cutting faces in a novel manner. Other objects and advantages of the invention will, however, hereinafter more fully appear.

This application is a division of my copending application, Serial No. 515,493, filed December 24, 1943.

In the accompanying drawing there are shown for purposes of illustration two forms of cutter bits which may be made in accordance with the improved method.

In this drawing:

Fig. 1 is a side elevational view of a rhomboidal cutter bit formed in accordance with the improved method.

Fig. 2 is a perspective view of the cutter bit shown in Fig. 1.

Fig. 3 is a somewhat diagrammatic view illustrating the novel method of forming the cutter bit shown in Figs. 1 and 2.

Fig. 4 is a side elevational view of a triangular cutter bit formed in accordance with the novel method.

Fig. 5 is a perspective view of the cutter bit shown in Fig. 4.

Fig. 6 is a somewhat diagrammatic view illustrating the novel method of forming the cutter bit shown in Figs. 4 and 5.

In both embodiments of the invention, there is shown a cutter bit of the relatively small double pointed reversible type adapted for association with a mining machine cutter chain. Each form of cutter bit shown is provided with shoulders or abutments on its cutting faces adapted for engagement with supporting means in the reversed positions of the bit; and in one embodiment, one of the shoulders is adapted for engagement by an adjustable holder for firmly locking the cutter bit in cutting position on its supporting means. As is fully described in the copending application, Serial No. 515,493, above referred to, one of the shoulders on the cutter bit is adapted for engagement with the chain block and the other shoulder is adapted for engagement by an adjustable holder received in the chain block socket. By the provision of the shoulders or abutments on the bit faces, the cutter bit is firmly supported and rigidly locked in cutting position on the cutter chain. Since the manner of mounting the cutter bits in cutting position on the chain block of the cutter chain is fully described in the above copending application and does not enter into the present invention, further consideration thereof herein is unnecessary.

In the embodiment of the invention shown in Figs. 1 to 3 inclusive, the cutter bit is generally designated 1 and is preferably generally rhomboidal in shape in side elevation and has parallel front and rear plane cutting faces 2 and 3 of elongated diamond shape, terminating in cutting points 4 at the opposite extremities of the bit on the opposite sides of the bit body. The cutter bit is preferably generally diamond shaped in cross section and is preferably cut from a piece of bar stock of the desired material and shape in a novel manner to be later explained. The cutting faces of the bit are formed in a novel manner with projecting shoulders or steps 5 providing abutment surfaces 6 disposed at right angles to the cutting faces. The front face of the cutter bit, when the latter is in cutting position on the cutter chain, rests against a supporting surface, with the front abutment surfaces 6 of the bit engaging an outer supporting surface of the chain block. The rear surface of the cutter bit is engaged within a recess in an adjustable holder with the holder overlying the abutment surface 6 on the rear bit face firmly to lock the cutter bit in cutting position on the block.

The improved method of forming the rhomboidal shaped cutter bit above described is shown somewhat diagrammatically in Fig. 3. As above stated, the cutter bit is preferably formed of bar stock of the desired material and shape. The cutter bit may be formed by cutting from approximately diamond shaped or symmetrically shaped bar stock, forming the cutting faces by cutting the stock diagonally and making successive diagonal cuts. By selecting bar stock which is of symmetrical form with respect to axes at right angles to each other, the opposed faces of the cutter bit will necessarily be the same if the angles of the cutters to the bar be maintained the same. The cutter bit may be formed by making parallel cuts at A and B at opposite sides of the bar stock, and a pair of slots may be cut simultaneously by cutter wheels or saws C and D, which may be fed concurrently toward the bar stock from one side thereof, or relative to which the bar stock may be bodily moved, in a manner to make cuts which substantially join near the center of the bar stock at E. The slots are disposed in parallelism and in close adjacency so that one wall of one cut is in substantially the same plane of the wall of the other cut. The cuts made not only sever the bit from the bar stock, but also concurrently form the shoulders or steps 5 on the bit faces. If desired, several of the parallel cuts at one side of the bar stock may be made, and then those at the other side. The distinctive feature is that the cut freeing one end of the bit and the other freeing the other end are in such close relation to each other that when both are completed, the bit is freed and has a step between its ends at the side which has just been completed. After being formed, the bits will be hardened and tempered as may be desired, and will require no individual sharpening, if suitable bar stock be employed.

In the embodiment shown in Figs. 4, 5 and 6, a different form of cutter bit is employed. A cutter bit 7 is of generally triangular shape in side elevation and preferably generally diamond shaped in cross section and has oppositely inclined faces 8 of elongated diamond shape, terminating in cutting points 9 at the opposite extremities of the bit body. The cutting faces have ledge-like shoulders 10 providing abutment surfaces 11 at right angles to the cutting faces, and in the reversed positions of the cutter bit on the chain block, the abutment surfaces 11 selectively engage a surface on the chain block in the manner fully described in the copending application, Serial No. 515,493.

The method of forming the triangular shaped cutter bit 7, shown in Figs. 4 and 5, will now be described. The cutter bit is preferably formed of suitable flat bar stock and cuts may be made at F and G by a pair of parallel cutter wheels or saws H and I, arranged in close adjacency so that the inner adjacent surfaces of the cuts lie substantially in a common plane. The bit may be formed by cutting from approximately diamond shaped or symmetrically shaped bar stock, forming the cutting faces by cutting the stock diagonally and making parallel diagonal cuts, completing the bit by turning over the stock between the cuts and the next ones. By selecting bar stock which is of symmetrical form with respect to axes at right angles to each other, the faces of each bit will necessarily be the same if the angle of the cutters to the bar be maintained the same. The cutters may be fed concurrently toward the bar stock to make parallel cuts which substantially join at J near the longitudinal center of the bar stock. The cutters not only form the cuts to sever the bits from the bar stock but also concurrently provide the ledge-like shoulders or steps on the oppositely inclined bit faces.

It will be evident that while rhomboidal and triangular shaped cutter bits of generally diamond shaped cross section are shown, other bit shapes may be employed to advantage. In accordance with the novel method, the cutter bits are not only cut from a piece of flat bar stock in an improved manner, but also the shoulders or abutments on the bit faces are concurrently formed in an improved manner. By the novel method of forming a cutter bit, not only are bits of an improved shape provided but also the bits are relatively inexpensive and may be rapidly formed. These and other advantages of the invention will be clearly apparent to those skilled in the art.

While there are in this application specifically described two forms of cutter bits which may be made in accordance with the improved method, it will be understood that these have been shown for purposes of illustration and that the invention may be modified and practiced in other manners without departing from the spirit or the scope of the appended claims.

What I claim as new and desire to secure as Letters Patent is:

1. A method of forming cutter bits from flat bar stock of symmetrical cross section, consisting of cutting parallel slots of equal depth diagonally of the bar stock from the opposite side edges of the latter, said slots being disposed in close adjacency so that their adjacent walls lie in a common plane.

2. A method of forming cutter bits from bar stock, consisting of cutting parallel slots diagonally of the bar stock, said slots being disposed in close adjacency so that their adjacent walls lie in a common plane, and cutting said slots to a depth substantially to join the same at least adjacent the longitudinal center of the bar stock substantially to sever the stock.

3. A method of forming cutter bits from bar stock, consisting of feeding a pair of parallel cutters concurrently toward the stock to make parallel cuts diagonally of the stock, said cutters being disposed in close adjacency so that the adjacent walls of the cuts made thereby lie in a common plane, said cutters operating, as they move towards and through the bar stock to produce cuts that substantially meet so that said cuts are at least substantially joined adjacent the longitudinal center of the stock.

4. A method of forming a cutter bit from bar stock, consisting of cutting parallel slots in the stock, said slots being disposed in close adjacency so that their adjacent walls lie in a common plane, and completing a bit by turning over the stock after the cutting of the parallel cuts and prior to the cutting of the next ones and repeating the cutting operation.

5. A method of forming cutter bits from flat bar stock, consisting of making parallel cuts diagonally of the bar stock from the opposite sides of the bar, said cuts being disposed in parallelism and in close adjacency so that their adjacent walls lie in a common plane.

6. A method of forming cutter bits from flat bar stock of symmetrical cross section, consisting of making parallel cuts of equal depth diagonally of the bar stock from the opposite side edges of the latter, said cuts being disposed in parallelism and in close adjacency so that their adjacent walls lie in a common plane, and said cuts substantially joining adjacent the longitudinal center of the bar stock substantially to sever the latter.

7. A method of forming a triangular cutter bit from flat bar stock of symmetrical cross section, consisting of making parallel cuts of equal depth diagonally of the bar stock from the opposite side edges of the latter, said cuts being disposed in close adjacency so that their adjacent walls lie in a common plane, and completing the triangular bit by turning over the stock upon completion of the parallel cuts and prior to the making of the next ones and repeating the cutting operation.

LEON E. SIMMONS.

REFERENCES CITED

The following references are of record in the file of this patent:

UNITED STATES PATENTS

| Number | Name | Date |
|---|---|---|
| 1,995,234 | Wenzlick | Mar. 19, 1935 |
| 2,091,128 | Anderson | Aug. 24, 1937 |